(12) United States Patent
Dasbach

(10) Patent No.: US 9,222,703 B2
(45) Date of Patent: Dec. 29, 2015

(54) OPTICALLY ACTIVE MULTILAYER SYSTEM FOR SOLAR ABSORPTION

(75) Inventor: Reinhard Dasbach, Bernburg (DE)

(73) Assignee: ALMECO GMBH, Bernburg (DE)

( * ) Notice: Subject to any disclaimer, the term of this patent is extended or adjusted under 35 U.S.C. 154(b) by 845 days.

(21) Appl. No.: 13/509,179

(22) PCT Filed: Nov. 5, 2010

(86) PCT No.: PCT/EP2010/066958
§ 371 (c)(1),
(2), (4) Date: May 10, 2012

(87) PCT Pub. No.: WO2011/057972
PCT Pub. Date: May 19, 2011

(65) Prior Publication Data
US 2012/0224256 A1     Sep. 6, 2012

(30) Foreign Application Priority Data
Nov. 11, 2009  (DE) ............... 20 2009 015 334 U

(51) Int. Cl.
*F24J 2/48* (2006.01)
*B23K 26/18* (2006.01)
(Continued)

(52) U.S. Cl.
CPC .............. *F24J 2/487* (2013.01); *B23K 26/009* (2013.01); *B23K 26/18* (2013.01); *B23K 26/243* (2013.01);
(Continued)

(58) Field of Classification Search
CPC ..................................... F24J 2/485
USPC ........... 126/714, 652, 676; 427/162; 359/350
See application file for complete search history.

(56) References Cited

U.S. PATENT DOCUMENTS 4,097,311 A     6/1978  Ishibashi et al.
4,582,764 A *   4/1986  Allerd et al. .................. 428/623
(Continued)

FOREIGN PATENT DOCUMENTS

CN       101408354 A       4/2009
DE    10 2004 010 689 B3   6/2005
(Continued)

OTHER PUBLICATIONS

Duerr, Welding Thermal Solar Absorbers, Industrial Laser Solutions, Sep. 2006, p. 12-14.
(Continued)

*Primary Examiner* — Avinash Savani
(74) *Attorney, Agent, or Firm* — Duane Morris LLP

(57) ABSTRACT

The present invention pertains to a composite material for use as a selective solar absorber with a carrier layer (1), wherein at least the following layers are present on a side (B) of the carrier layer: A reflection layer (3), an absorber layer (5) and a dielectric and/or oxidic antireflection layer (7), wherein a layer (4) consisting of a nitride, a carbide or a carbonitride of a metal or of a mixture of two or more metals from subgroup IV, V or VI is located between absorber layer (5) and reflection layer (3), and an optically active layer (6) consisting of a metal compound with stoichiometric composition is located between absorber layer (5) and the dielectric antireflection layer (7).

Figure 1:
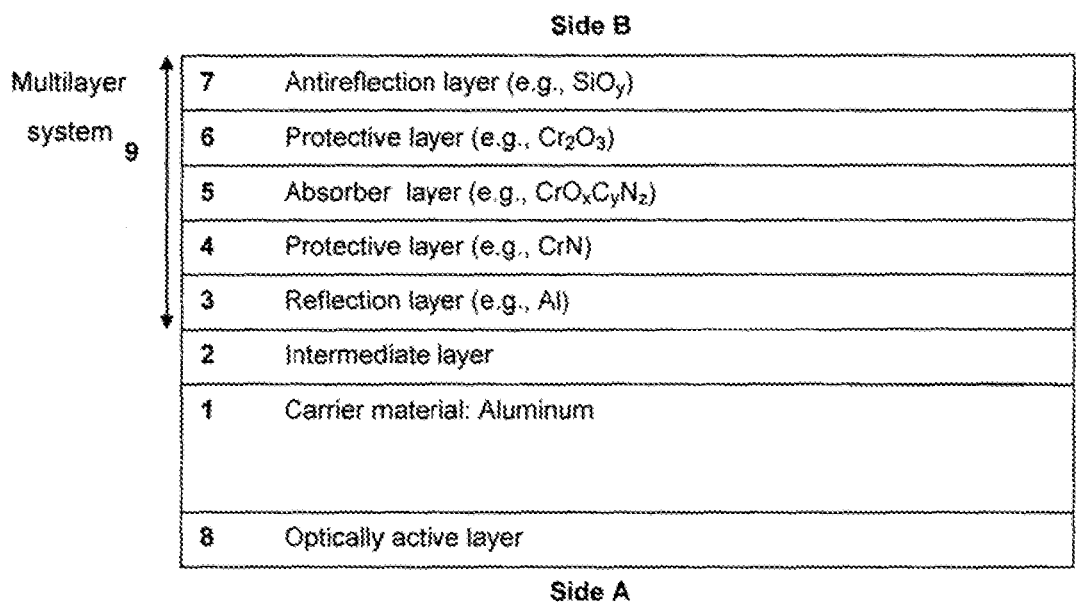

In addition, the present invention pertains to a composite material for use as a selective solar absorber with a carrier layer (1) consisting of aluminum or an aluminum alloy, wherein an optically active layer (8), which reduces the reflection of the uncoated carrier material by at least 5% at a specific wavelength in λ the wavelength range between 200 nm and 10 μm and preferably between 200 nm and 2,500 nm during irradiation at a specific incidence angle and reduces the reflection of the uncoated carrier material by no more than 20% and preferably by no more than 5% in the wavelength range between 2.5 μm, is located on a side (A) of the carrier layer.

21 Claims, 4 Drawing Sheets

(51) Int. Cl.
B23K 26/24 (2014.01)
B23K 26/32 (2014.01)
F24J 2/46 (2006.01)
B23K 26/00 (2014.01)

(52) U.S. Cl.
CPC ............ B23K 26/324 (2013.01); B23K 26/328 (2013.01); B23K 26/3213 (2013.01); B23K 26/3226 (2013.01); B23K 26/3233 (2013.01); B23K 26/3273 (2013.01); F24J 2/4652 (2013.01); F28F 2275/067 (2013.01); Y02E 10/40 (2013.01)

(56) References Cited

U.S. PATENT DOCUMENTS

| | | | | |
|---|---|---|---|---|
| 5,214,530 | A * | 5/1993 | Coombs et al. | 359/359 |
| 5,523,132 | A | 6/1996 | Zhang et al. | |
| 5,670,248 | A | 9/1997 | Lazarov et al. | |
| 5,776,556 | A | 7/1998 | Lazarov et al. | |
| 6,650,478 | B1 * | 11/2003 | DeBusk et al. | 359/585 |
| 7,585,568 | B2 | 9/2009 | Barshilia et al. | |
| 7,793,653 | B2 | 9/2010 | Kuckelkorn et al. | |
| 7,909,029 | B2 | 3/2011 | Kuckelkorn et al. | |
| 2007/0231501 | A1 * | 10/2007 | Finley | 427/531 |
| 2008/0190414 | A1 | 8/2008 | Link | |
| 2008/0264473 | A1 * | 10/2008 | Cumpston et al. | 136/251 |
| 2010/0313875 | A1 * | 12/2010 | Kennedy | 126/652 |

FOREIGN PATENT DOCUMENTS

| | | |
|---|---|---|
| DE | 10 2006 039 669 A1 | 2/2008 |
| DE | 10 2006 056 536 B3 | 2/2008 |
| DE | 10 2004 019 061 B4 | 11/2008 |
| EP | 0 794 032 B1 | 9/2002 |
| EP | 1 217 315 B1 | 1/2005 |
| WO | WO 95/17533 | 6/1995 |
| WO | WO 96/02798 | 2/1996 |
| WO | WO 2006/072433 A1 | 7/2006 |

OTHER PUBLICATIONS

Hecht et al., "Optics," Addison Wesley Publishing Co., 1974, p. 70-75, 312-317.

Graf et al., "Development of Large Area Sputtered Solar Absorber Coatings," Journal of Non-Crytalline Solids, vol. 218 (1997), p. 380-387.

Holloway et al., "Oxidation of Electrodeposited Black Chrome Selective Solar Absorber Films," Thin Solid Films, vol. 72 (1980), p. 121-128.

Holloway et al., "Oxidation and Diffusion in Black Chrome Selective Solar Absorber Coatings," Thin Solid Films, vol. 177 (1989), p. 95-105.

Imenes et al., "A New Strategy for Improved Spectral Performance in Solar Power Plants," Solar Energy, vol. 80 (2006), p. 1263-1269.

Kennedy, "Review of Mid- to High-Temperature Solar Selective Absorber Materials," NREL/TP-520-31267, Jul. 2002.

Kohl et al., "Advanced Procedure for the Assessment of the Lifetime of Solar Absorber Coatings," Solar Energy Materials and Solar Cells, vol. 84 (2004), p. 275-289.

NAL Coating Flyer, "Sputter Deposited Coatings for Mid- and High-Temperature Solar Selective Applications.".

Nunes et al., "Graded Selective Coatings Based on Chromium and Titanium Oxynitride," Thin SØlid Films, vol. 442 (2003), p. 173-178.

Panchenko et al., "Selective Absorber Systems Based on Sn, Cr Oxides and Al Nitride," Coatings on Glass 1998, 2nd International Conference on Coatings on Glass, p. 287-290.

Schuler et al., "Structural and Optical Properties of Titanium Aluminum Nitride Films," J. Vac.. Sci. Technol. A 19(3), May/Jun. 2001, p. 922-929.

Shanker et al., "Electrodeposition of Black Chrome Selective Solar Absorber Coatings with Improved Thermal Stability," Thin Solid Films, vol. 127 (1985), p. 181-189.

Wackelgard et al., "Selectively Solar-Absorbing Coatings," in Solar Energy, The State of the Art, ed. J. Gordon (2001), p. 109-144.

International Preliminary Report on Patentability and Written Opinion for PCT/EP2010/066958, May 24, 2012.

* cited by examiner

OPTICALLY ACTIVE MULTILAYER SYSTEM FOR SOLAR ABSORPTION

The present invention pertains to a composite material with a carrier, which consist in many cases of aluminum or an aluminum alloy, In a first embodiment, the carrier is provided on at least one side with an optically active multilayer system consisting of at least five layers, In a second embodiment, the carrier is provided on the reverse side with an optically active layer, which specifically affects the reflection of the uncoated carder material in such a way that the joining of heat carrier tubes to the composite material with the laser becomes more efficient and cost effective. Furthermore, the optical parameters of this optically active layer are selected to be such that this layer reduces the high reflection of the metallic carrier material in the infrared range only insignificantly and thus keeps heat radiation losses low in case of use in a solar collector, The efficiency of heat transfer to a heating medium is thus improved. The two embodiments are preferably combined with one another. The efficiency of heat transfer to a heating medium is improved. The two embodiments are preferably combined with one another. [Repetition—Tr. Ed.] The composite material is especially suitable for use in thermal solar collectors.

The task in thermal solar collectors is to absorb the incident solar radiation (300-2,500 nm) and convert it into heat in the best possible manner. To minimize losses due to infrared radiation, the reflection of a material being used there must be as high as possible according to Kirchhoff's law of radiation and the condition of the preservation of energy in the wavelength range between 2.5 µm and 50 µm. This applies to both the side of the absorber exposed to the solar radiation and the reverse side. It is therefore likewise important for use in a solar collector to use a material that meets the requirement in terms of high reflection in the wavelength range of 2.5 µm to 50 µm on both sides of the material being used.

Materials for solar collectors are also called selective solar absorbers. A composite material, which possesses these optical properties, is known under the name TiNOX and is described in WO 95/17533, The TiNOX material is a so-called reflector absorber tandem (cf., e.g., "Solar Energy, the State of the Art" by Jeffrey Gordon, 2001 ISES), The above-described optical properties are obtained here by applying an absorber layer, which absorbs the solar radiation as efficiently as possible but is extensively transparent in the range of infrared radiation, to the surface having high reflection in the wavelength range between 2.5 µm and 50 µm, preferably a metal such as Cu, Al, Mo, Au, Ag, Ta, Va, Fe or alloys thereof. High reflection is thus achieved in the infrared range due to the subjacent, highly reflecting surface.

A metallic carrier material consisting of Cu or Al, which has the desired high reflection in the wavelength range of 2.5-50 µm, is preferably used as the highly reflecting surface (T1) in the TiNOX composite material. However, the possibility of producing the highly reflecting surface by coating any (not optically active) carrier material with one of the above-mentioned metals is also pointed out in the above-described patent The carrier material itself or the highly reflecting metallic coating applied to the carrier material is thus part of the optical multilayer system.

The first layer (T2) applied to the highly reflecting surface (mirror layer), the so-called absorber layer, preferably consists of TiNxOy (with x, y=0.1-1.7) in the case of TiNOX. The topmost layer (T3) is a so-called antireflection layer. This layer consists of a metal oxide, preferably $SiO_2$, $ZrO_2$, $HfO_2$, $Al_2O_3$ or $Y_2O_3$. It is used to minimize the reflection of the solar radiation on the surface of the composite material and thus to further increase the absorption of solar radiation in the composite material.

A plurality of other, selective absorbers, which are based on the principle of the reflector-absorber tandem, are described in the literature. The absorber layer consists in most cases of a substoichiometric metal compound or so-called cermets, in which metal particles are distributed in a dielectric matrix. Chromium oxide ($CrO_x$, with a substoichiometric quantity of oxygen relative to Cr(III)) or a "cermet" from chromium particles in stoichiometric chromium(III) oxide is frequently proposed now as a light-absorbing layer on the side exposed to the sun, besides the above-mentioned titanium oxynitride on a copper carrier, see, e.g., C. E. Kennedy, Review of Mid- to High-Temperature Solar Selective Absorber Materials, NREL (National Renewable Energy Laboratory), Technical Report, July 2002, as well as literature cited therein from O. A. Panchenko et al., in *Probl. At. Sci. Technol. Ser.: Plasma Phys.*, 132 (1999), 253, and in Int. Conf. Coat. Glass, High-Perform. Coat. Transparent Syst. Large-Area High-Vol. Appl., Pulker H. K. et al., Elsevier Science, Amsterdam, 1999, p. 287. Graduated layers have also been discussed in the literature, cf., e.g., B. C. Nunes et al., *Thin solid films*, 442 (2003), pp. 173-178. W. Graf et al. proposed in *Journal of Non-Crystalline Solids*, 218 (1997), pp. 380-387 an allegedly graduated mixture of chromium oxide and chromium nitride, which was likewise sputtered in the form of a cermet directly onto a copper substrate. This mixture was developed because graduated chromium oxide layers are said to be hardly able to be prepared, because there are allegedly sharp stability transitions between metallic chromium and chromium oxide, so that even slight changes in the production conditions led to the deposition of metal instead of metal oxide and vice versa. This situation is said to be remedied by the addition of nitrogen to the oxygen atmosphere, because a broad range of different stoichiometries exists for the nitrides. However, what is then discussed in this publication is a "cermet with a low percentage of CrN in $Cr_xO_y$," without indication of a graduation. This [cermet] is said to be sufficiently resistant to moisture and temperature, the most important environmental factors for the lifetime of solar heat collectors. The standard test procedure for determining the lifetime of a selective solar absorber is described in M. Köhl, M. Heck, S. Brunold, U. Frei, B. Carlsson, K. Möller: "Advanced procedure for the assessment of the lifetime of solar absorber coatings," *Solar Energy Materials & Solar Cells*, 84 (2004), pp. 275-289.

However, substoichiometric layers have the drawback that they may become hot, reaching up to 230° C., during operation in a solar collector, and the unsaturated metal atoms will then react with the atmospheric oxygen and the layers thus become oxidic over time (cf., e.g., Holloway, P. H.; Shanker, K.; Pettit, R. B.; Sowell, R. R.: "Oxidation of electrodeposited black chrome selective solar absorber films," *Thin Solid Films*, Vol. 72, pp. 121-128, 1980). The absorbency decreases in the process. In addition, a diffusion process of the metal atoms from the mirror layer into the absorber layer begins (cf., e.g., Holloway, P. H.; Shanker, K.; Alexander, G. A.; de Sedas, L.: Oxidation and diffusion in black chrome selective solar absorber coatings, *Thin Solid Films*, Vol. 177, pp. 95-105, 1989). Oxidation of the mirror layer is seen as well. In addition, diffusion processes within the absorber layer may lead to a reduction of the gradient (cf., e.g., Christina Hildebrandt: "High-temperature-resistant absorber layers for linearly concentrating solar thermal power plants," Dissertation 2009, University of Stuttgart). These processes lead to a change (worsening) of the optical properties of the composite material during the average lifetime of the solar collector of over 20 years.

Figure 2:
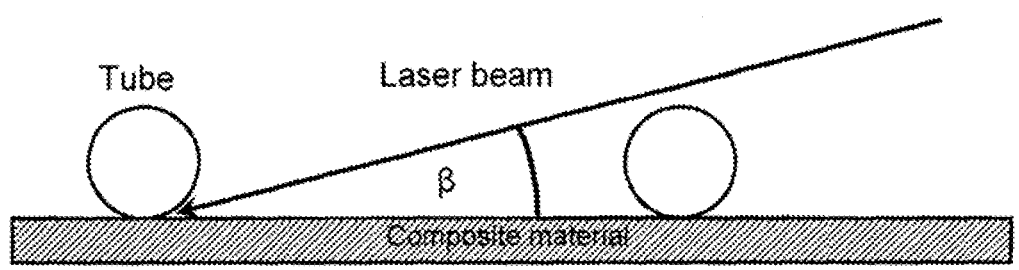

Besides, it is important for the function of a solar collector to efficiently release the heat generated to a heat carrier medium. Metal tubes (mainly from copper, stainless steel or aluminum) are usually fixed to the reverse side of the material according to suitable joining methods. A suitable heat carrier medium (mainly a water-glycol mixture or a thermal oil), which transports the heat to the desired tapping site, is then pumped through the tubes. It is important to achieve the best possible heat conduction between the material and the tube. Laser welding (see "Laser light meets sunlight" by Dr. Ulrich Dürr, *Mikroproduktion* March 2006, Carl Hauser Verlag Munich, p. 28) has proved to be especially suitable for joining aluminum absorbers to tubes. The laser is Nd-YAG pulsed layer with a laser wavelength of 1,064 nm in most cases. Based on the high reflection of an untreated aluminum surface in this wavelength range, more than 95% of the available radiation energy is reflected. Thus, only very little energy is available for the welding operation. The reflection at 1,064 nm can be reduced to a minimum of 90% by the use of a flat incidence angle β of the laser beam between 10° and 20°, see FIG. 2, which shows the irradiation conditions with the use of a laser for welding the composite material to tubes. FIG. 2 shows the reflection spectrum of an untreated aluminum surface at a vertical incidence angle as well as at an incidence angle of 10°. The incidence angle cannot be reduced further for production technical reasons, because the laser beam is hindered by the adjacent tubes, which usually have a spacing of at most 120 mm. The use of high-power lasers is therefore necessary. In addition, only a low pulse frequency can be used, which leads to a lower productivity or low spot density. Such a spot density leads to lower heat conduction between the absorber plate and the tube, which does not fail to reduce the efficiency of the solar collector in case of a solar collector.

To overcome the above difficulties, the present invention provides solutions, which may be embodied separately or combined.

The carrier material of the composite material according to the present invention consists of aluminum or an aluminum alloy. Copper or stainless steel may also be used, instead, as the basis for the layer system on the side facing the sun.

With reference to FIG. 1, the layer system of side B of the composite material, which side faces the sun, will be first described below.

This is an optically active multilayer system (9), which comprises at least 5 layers (3, 4, 5, 6, 7), wherein the topmost layer (7) is a dielectric and/or oxidic layer preferably having the composition described below, which is used as an antireflection layer, and the lowermost layer (3) of the optically active system consists of a metal or a metal alloy with an integral reflection greater than 80% in the wavelength range between 2.5 μm and 50 μm, preferably of Al, Cu, Cr, Au, Ag, Ta, Ni, Va, Pt, Fe, Ti and/or Mo and alloys thereof. Al and Cu are especially preferred, but Mo, Ni and Ag are preferred as well. This layer is usually called mirror layer. An intermediate layer (2) may be inserted between the lowermost layer (3) of the optically active system and the carrier material in order to increase the adhesion of the multilayer system and/or to suppress the diffusion of metal from the carrier material into the multilayer system. It may be, for example, a coating or an adhesive layer, which improves the adhesion of the metal layer, to the metallic substrate. However, this layer may also be absent if the connection between layer (3) and the substrate is sufficient. The middle layer (5) is the absorber layer proper of the system; it is a substoichiometric metal compound of oxygen and/or nitrogen and/or carbon having the composition $Me_rAl_sN_xO_yC_z$, in which Me denotes a metal from subgroup IV, e.g., Ti or Cr, and the subscripts r and s designate the ratio of metal and Al (for s+r=2, the ratio may assume any desired value between 0 and 1.9), whereas the subscripts x, y and z designate anon-stoichiometric ratio in the oxides, nitrides and/or carbides, providing that the sum of x+y+z indicates a substoichiometry, of the anions relative to the cations. An oxidically saturated (stoichiometric) metal oxide layer (6) of aluminum or a metal from subgroup IV or V or VI, e.g., $Cr_2O_3$, is located between layer (5) and layer (7), while a metal nitride and/or metal carbide layer (4), which is a nitride, carbonitride or carbide of a metal from subgroup IV or V or VI, e.g., CrN or TiC, is located between layer (5) and layer (3). The topmost layer (7) of the optically active multilayer system is a dielectric layer, which has a refractive index between 1.3 and 2.1, preferably between 1.3 and 2.2, especially with the composition $MeO_vN_w$, in which the subscripts v, w designate a stoichiometric or non-stoichiometric ratio in the oxides and nitrides. Si, Zn, Sn, Zr, Hf, Cr, Al, Y or Bi may be used as the metal. Fluorides may also be used as an alternative.

The two layers, which are located below and above layer (5), are intended to protect the latter layer; they suppress the above-described aging processes. The metal nitride or carbide of the lower layer (4) acts as a barrier in order to suppress the diffusion of metal atoms from the mirror layer (3), and possibly also from the carrier material (1). Furthermore, it acts as a protective layer for protection against an oxidative attack on the mirror layer. Layer (6) above layer (5) is an oxidically saturated (stoichiometric) metal oxide layer, which cannot react further with atmospheric oxygen under the effect of oxygen. It acts as a protective layer against an oxidic attack on layer (5).

The optically active multilayer system according to the present invention absorbs more than 80% of the solar radiation under AM 1.5 conditions and has an integral reflection greater than 80% in the range of infrared radiation between 2.5 μm and 50 μm.

The multilayer system (9) according to the present invention comprising at least 5 layers is thus more resistant to oxidation and more stable under the effect of temperature than a multilayer system comprising 3 layers, which meets the same optical requirements.

In preferred embodiments, absorber layer 5 consists of titanium aluminum carboxynitride, a chromium oxynitride, especially of the composition $CrO_xN_y$, in which x=1.0-1.4 and y=0.02-0.4, or a chromium carboxynitride.

Figure 5:
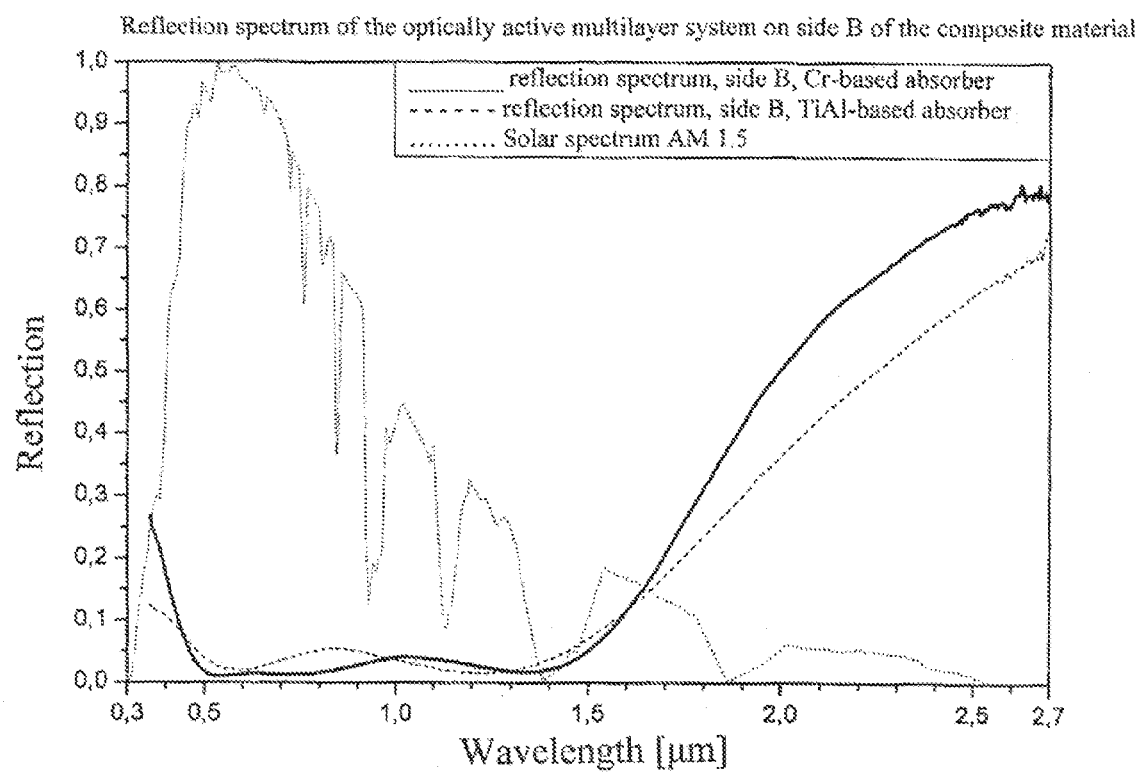

The reflection spectra of two embodiments of the multilayer system according to the present invention are shown in FIG. 5. The absorber layer (5) is a substoichiometric chromium oxynitride of the formula $CrO_xN_y$ with x=1.2-1.3 and y=0.1-0.2 in one case, and titanium aluminum carboxynitride of the formula $Ti_rAl_sO_xN_yC_z$ with r=1, s=1, x=1.2-1.4, y=0.02-0.1 and z=0.2-0.3, i.e., a likewise substoichiometric composition, in another case.

The reverse side A of the multilayer system facing away from the sun may remain uncoated; this side may also be coated as an alternative.

In one embodiment of the present invention, which may be combined with the above-mentioned layer system of the front side (B) and may also be embodied independently therefrom, the reverse side may have an optically active layer, which reduces the reflection of the uncoated carrier material by at least 5% at a specific wavelength λ in the wavelength range between 200 nm and 10 μm and preferably between 200 nm and 2,500 nm during irradiation at a specific incidence angle and reduces the integral reflection of the uncoated carrier material by no more than 20% and preferably by no more than 10% and especially preferably by no more than 5% in the wavelength range between 2.5 μm and 50 μm.

Figure 3:
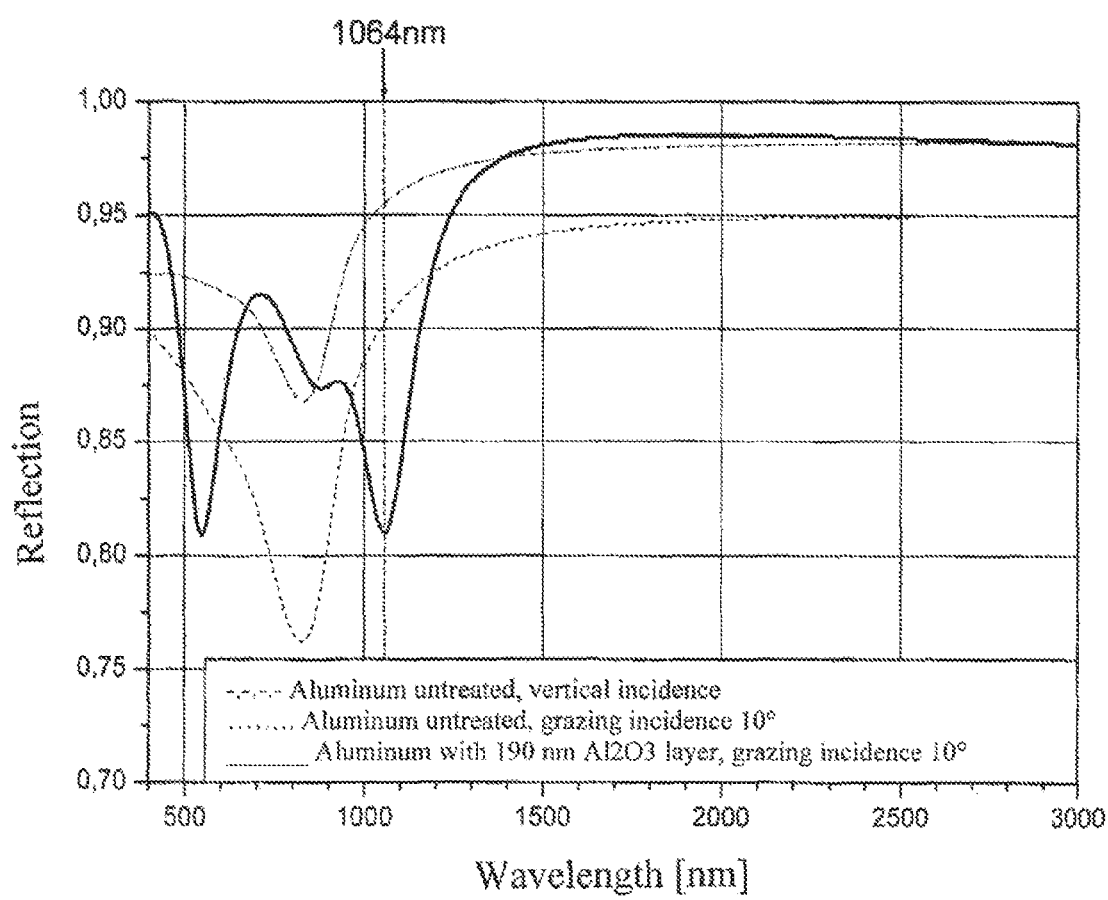

The efficiency of heat transfer to the heating medium flowing through the tubes is greatly increased by the reverse side of the composite material as proposed according to the present invention. This is brought about by the reflection of the aluminum surface being reduced by the optically active layer applied to the reverse side, so that less laser radiation energy is lost. FIG. 3 shows the reflection spectrum of an aluminum surface provided with an $Al_2O_3$ layer having a thickness of 190 nm at an incidence angle β=10°. It is seen that the reflection for 1,064 nm can be reduced to less than 82% in this especially preferred case. It is thus possible to increase either the spot density or productivity. However, reflection is reduced only minimally at most in the range of heat radiation due to the special properties of the optically active layer according to the present invention, so that heat radiation losses are avoided in case of use in a solar collector.

To reduce reflection as efficiently as possible at the laser wavelength being used, the layer thickness of the optically active layer is selected to the such that a destructive interference of the reflecting beams is achieved. The condition for this is that a phase difference of an odd multiple of π is generated between the beam reflected primarily on the surface of the optically active layer and the beams that pass first through the optically active layer and then exit again at the surface of the optically active layer.

Figure 4:
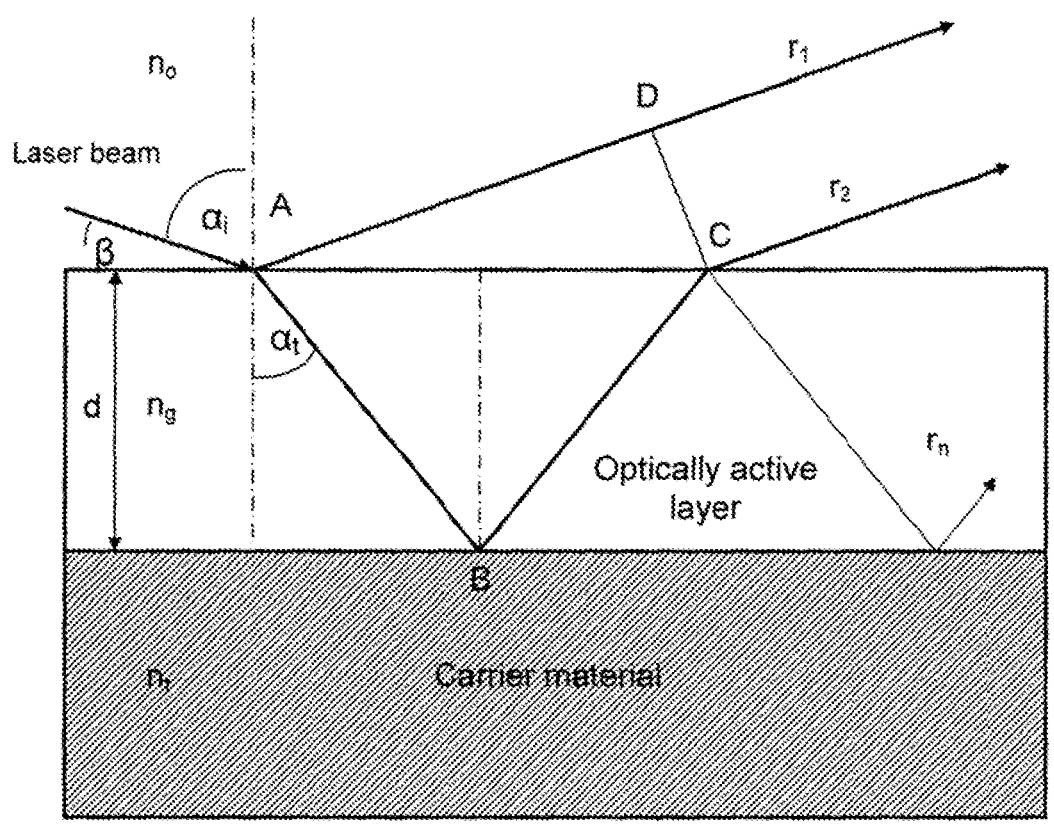

When considering a beam with the laser wavelength λ, which falls on the composite material at an incidence angle $α_i$ ($α_i$+β=90°) (see FIG. 4, which shows a schematic diagram to illustrate the beam path of a laser beam irradiated onto the composite material at an incidence angle β or incidence angle $α_i$ ($α_i$,β=90°) and reflected), this [beam] is partly reflected on the surface of the optically active layer (r1) and it partly passes through the layer and is then likewise partly reflected at the lower boundary surface between the optically active layer and the aluminum carrier material (r2). Both the beam reflected at point A and that reflected at point B undergoes a phase jump of π. The two phase jumps for the reflected beams r1 and r2 thus compensate each other. In order for a phase difference of π to develop between the wave fronts of the reflected beams r1 and r2, the difference between the optical wavelength (AD), over which beam r1 travels, and the optical wavelength (ABC) of the beam r2 passing through the optically active layer must be an odd multiple of λ/2.

It can be shown that the percentage of the beam that is again reflected into the optically active layer at point C and exits the surface of the optically active layer only after a plurality of internal reflections ($r_n$) has the same phase position as beam $r_2$. It is therefore sufficient to consider only the beams r1 and r2 to derive the optimal layer thickness).

The optical wavelength difference A for the first two reflected beams r1 and r2, given by $$Δ=n_g[(\overline{AB})+(\overline{BC})]-n_0(\overline{AD})$$

(here, $n_0$, $n_g$, $n_t$ are the refractive indices of air, the optically active layer and the carrier medium), in which $$(\overline{AB})=(\overline{BC})=d/\cos α_t$$

is obtained as $$Δ = \frac{2n_g d}{\cos α_t} - n_0(\overline{AD})$$

in which $$(\overline{AD})=(\overline{AC})\sin α_i$$

The angles $α_i$ and $α_t$ are linked via Snell's law of refraction, so that the following relationship is obtained:

$$(\overline{AD}) = (\overline{AC})\frac{n_g}{n_0}\sin α_t$$

Further, $$(\overline{AC})=2d \tan α_t$$

And, $$Δ=2n_g \cos α_t$$

is thus obtained for the optical path difference after some trigonometric transformations.

The phase difference δ of the two beams r1 and r2 is now given by $$δ = \frac{2π}{λ}Δ = \frac{4π n_g}{λ}d\cos α_t$$

Maximum attenuation of reflection is obtained for δ=π.

$$π = \frac{4π n_g}{λ}d\cos α_t$$

By solving this formula for d and replacing the angle $α_t$ with the incidence angle $α_i$, the following relationship is obtained for the optimal layer thickness of the optically active layer:

$$d = \frac{λ}{4n_g}\left(1 - \frac{n_0^2}{n_g^2}\sin^2 α_i\right)^{-1/2}$$

Using this formula, it is possible to adjust the layer thickness d of an optically active layer to the laser wavelength λ used and to the laser beam incidence angle $α_i$ used (usually between 70° and 80°). It is thus possible to specifically adjust the composite material to the particular application in a customized manner, because the corresponding laser beam wavelengths are known (they range from about 200 nm to about 10 μm).

The maximum attainable reduction of reflection can be calculated by means of Fresnel's equations. The reflection spectra in FIG. 4 were calculated by means of a matrix method derives from Fresnel's equations, cf., e.g., E. Hecht: *Optik* [Optics], Verlag Oldenburg, 2001.

Furthermore, the optically active layer (8) on side A may be designed such that it also acts at the same time as a corrosion protection for the carrier material used. Reduction of the reflection of the reverse side of the carrier material due to corrosion can thus be prevented from occurring. It is thus guaranteed that the losses due to infrared radiation will also remain low during a long-term use of the composite material in a solar collector.

Especially preferred materials for layer (8) are those that are also used for the antireflection layer (7) on the front side, e.g., aluminum oxide or silicon dioxide. An aluminum oxide layer can be applied especially preferably by electrochemical anodization of the aluminum carrier material.

The composite material according to the present invention is characterized, compared to composite materials used hitherto in solar collectors, in that the optically active layer (8) applied to side A of the carrier material makes the joining of heat carrier tubes with the composite material by means of the laser more efficient and more cost-effective. Furthermore, the optical parameters of this layer (8) are selected to be such that this layer reduces high reflection of the metallic carrier material in the infrared range insignificantly and thus keeps heat radiation losses low during use in a solar collector. Layer (8) may now be designed such that it prevents the corrosion of the metallic reverse side, so that reflection decreases insignificantly even during prolonged use of the composite material in a solar collector. The heat radiation losses thus remain low. The optically active multilayer system on side (B) is characterized by an especially high temperature stability, which is achieved due to the use of chemically saturated protective layers, which are part of the optically active intermediate system.

The composite material according to the present invention can be produced in a conventional manner. For example, commercial PVD processes, but, e.g., also CVD or PECVD processes may be used to deposit the absorber layers according to the present invention. The metal strip (carrier material) is now moved in a vacuum chamber by means of a winding mechanism at constant strip velocity over different PVC coating stations, so that the individual layers of the multilayer system described can be successively applied to side B of the carrier material.

The metal strip may be introduced as a roll into the vacuum chamber before the coating process and removed after coating (batch process) or introduced into the vacuum from the atmosphere via a vacuum lock system, coated and brought into the atmosphere via a second vacuum lock system (air to air process).

The metal strip preferably passes through one or more plasma cleaning stations prior to coaling in order to remove surface contaminations of the metal substrate (e.g., water, oils, greases, oxides) and thus to guarantee good adhesion of the multilayer system.

For example, magnetron sputtering, gas flow sputtering, ion beam sputtering, electron beam vapor deposition, thermal vapor deposition or ARC vapor deposition may be used in the PVD processes. It is possible to use only one specific PVD process to apply the individual layers. Since a PVD process is usually especially well suited for depositing different materials, it is also possible to employ different PVD processes simultaneously.

A reactive PVD process is usually used to deposit oxides, nitrides and/or carbides. A metal is deposited here by means of one of the processes described, and oxygen and/or nitrogen and/or a carbon-containing gas is admitted into the PVD chamber via a gas distribution system at a defined flow rate, so that the metal reacts to form the desired compound.

The layer thickness of the layers can be controlled in the known manner by varying the velocity of the strip or the power introduced into the individual PVD coating stations. The rate of deposition can be regulated and controlled according to different methods. Reflectometry, ellipsometry, crystal methods or X-ray fluorescence methods, etc., are used industrially for this.

The optically active layer on side A of the carrier material may be applied by one of the above-described PVD (also CVD and PECVD) processes. It is especially preferable to apply an aluminum oxide layer by electrochemical anodization of aluminum plate.

EXEMPLARY EMBODIMENT

Aluminum plate (aluminum of 99.5%-99.8% purity) having a thickness of 0.3 mm to 0.5 mm, to which an aluminum oxide layer with a thickness of 100 nm to 200 nm (especially preferably 190 nm) is applied in an electrochemical anodization process, is used as carrier material. The aluminum plate is coated with an aluminum oxide layer on both side A and side B. The aluminum oxide layer forms the optically active layer 8 on side A and the intermediate layer 2 on side B.

This electrochemically anodized aluminum strip is subsequently coated with a commercial air to air strip coating unit. (Such strip coating units are described, for example, in the series *Valcuumbeschichtung* [Vacuum Coating], Volume 5, pp. 187-199, VDT Verlag 1993, Gerhard Kienel, editor.)

The aluminum strip runs into the vacuum chamber via a plurality of strip locks and then passes through a plurality of plasma cleaning stations. The strip is subsequently led through a plurality of magnetron sputtering stations, which are separated from one another by flat locks.

The aluminum layer, which forms reflection layer 3, is applied by sputtering in the first sputtering station.

A CrN layer is deposited in the next sputtering station by reactive sputtering of chromium with defined addition of nitrogen; this CrN layer forms protective layer 4.

A substoichiometric $CrO_xN_y$, which forms absorber layer 5, is deposited in the next sputtering station by reactive sputtering of chromium with defined addition of an oxygen-nitrogen mixture.

A $Cr_2O_3$ layer, which forms protective layer 6, is deposited in the last sputtering station by the reactive sputtering of chromium with defined addition of oxygen.

The sputtering processes take place in a pressure range of $1^{-3}$ to $5^{-3}$ mbar. Argon is used as sputtering gas.

After passing through another flat lock, the strip enters an electron beam vapor deposition chamber. $SiO_2$ is vapor deposited here by means of electron beam technology. Oxygen is now admitted in a defined manner, so that a working pressure in the range of $1^{-4}$ to $5^{-4}$ mbar becomes established. The $SiO_2$ layer applied here forms antireflection layer 7 of the multilayer system.

The layer thicknesses of the individual layers of the multilayer system are determined and controlled by means of an ellipsometer system.

The strip is subsequently led again into the atmosphere through a multistage strip lock and wound up there.

The invention claimed is:

1. Composite material for use as a selective solar absorber, comprising a carrier layer consisting of aluminum, an aluminum alloy, copper or stainless steel, wherein at least the following layers are present on a side (B) of the carrier layer:
    a reflection layer consisting of a metal or a metal alloy with an integral reflection greater than 80% in the wavelength range between 2.5 μm and 50 μm,
    an absorber layer consisting of a substoichiometric metal compound of oxygen and/or nitrogen and/or carbon concerning the sum of the anions, wherein the metal is selected from among the metals of subgroup IV, chromium, a combination of a metal of subgroup IV with aluminum, or a combination of chromium with aluminum, wherein the aluminum is present in a percentage of at most 95 at. % relative to the total quantity of metal, wherein the absorber layer is located above reflection layer, a dielectric and/or oxidic antireflection layer with a stoichiometric or non-stoichiometric composition with a refractive index between 1.3 and 2.4, which is located above the absorber layer, characterized in that a layer consisting of a nitride, a carbide or a carbonitride of a metal or of a mixture of two or more metals from subgroup IV, V or VI is located between absorber layer and reflection layer, and an optically active layer consisting of a metal compound with stoichiometric composition is located between absorber layer and the dielectric antireflection layer.

2. Composite material in accordance with claim 1, characterized in that an intermediate layer is located between the carrier layer and the reflection layer.

3. Composite material in accordance with claim 1, characterized in that the reflection layer consists of a metal selected from among Al, Cu, Cr, Au, Ag, Ta, Ni, Va, Pt, Fe, Ti and Mo as well as alloys of two or more of these metals, preferably Al or Cu.

4. Composite material in accordance with claim 1, characterized in that the layer consisting of a nitride, a carbide or a carbonitride of a metal or of a mixture of two or more metals from subgroup IV, V or VI is a chromium carbide, a chromium nitride or a chromium carbonitride.

5. Composite material in accordance with claim 1, characterized in that the absorber layer has the composition $CrO_xC_yN_z$ or $Ti_rAl_sN_xO_yC_z$, wherein r+s =2, s =0–1.9 and the subscripts x, y and z are selected to be such that the metal compound is substoichiometric concerning the anions thereof.

6. Composite material in accordance with claim 1, characterized in that the optically active layer is a metal oxide layer of a metal from subgroup IV, V or VI or aluminum.

7. Composite material in accordance with claim 1, characterized in that the dielectric and/or oxidic antireflection layer consists of an oxide, nitride or oxynitride of a metal or silicon.

8. Composite material in accordance with claim 1, characterized in that the dielectric and/or oxidic antireflection layer is the outermost layer on said side.

9. Composite material for use as a selective solar absorber, comprising a carrier layer consisting of aluminum or an aluminum alloy, wherein an optically active layer, which reduces the reflection of the uncoated carrier material by at least 5% at a specific wavelength λ in the wavelength range between 200 nm and 10 μm, and preferably between 200 nm and 2,500 nm in case of irradiation at a specific incidence angle, and reduces the reflection of the uncoated carrier material by no more than 20% and preferably by no more than 5% in the wavelength range between 2.5 μm and 50 μm, is located on a side (A) of the carrier layer.

10. Composite material in accordance with claim 9, wherein the layer thickness of the optically active layer obeys formula $$d = \frac{\lambda}{4n_g}\left(1 - \frac{n_0^2}{n_g^2}\sin^2\alpha_i\right)^{-1/2}$$

in which λ is between 200 nm and 10 μm and $\alpha_i$ is an angle between 0° and 80°.

11. Composite material in accordance with claim 9, wherein λ=1,064 nm.

12. Composite material in accordance with claim 10, wherein $\alpha_i$ is an angle between 70° and 80°.

13. Composite material in accordance with claim 9, characterized in that the optically active layer, which reduces the reflection of the uncoated carrier material by at least 5% at a specific wavelength λ in the wavelength range between 200 nm and 10 μm, consists of an oxide, nitride or oxynitride of a metal, especially of aluminum or silicon.

14. Composite material in accordance with claim 9, characterized in that at least the following layers are present on a side (B) facing away from side (A) of the carrier layer:

a reflection layer consisting of a metal or a metal alloy with an integral reflection greater than 80% in the wavelength range between 2.5 μm and 50 μm, an absorber layer consisting of a metal compound of oxygen and/or nitrogen and/or carbon, which is substoichiometric concerning the sum of the anions, wherein the metal is selected from among the metals of subgroup IV, chromium as well as a combination of a metal of subgroup IV with aluminum or chromium with aluminum, wherein the aluminum is present in a percentage of at most 95 at. % relative to the total quantity of metal, wherein the absorber layer is located above reflection layer, and a dielectric and/or oxidic antireflection layer with a stoichiometric or non-stoichiometric composition with a refractive index between 1.3 and 2.4, which is located above absorber layer, characterized in that a layer consisting of a nitride, a carbide or a carbonitride of a metal or a mixture of two or more metals of subgroup IV, V or VI is located between absorber layer and reflection layer and an optically active layer consisting of a metal compound with stoichiometric composition is located between the absorber layer and the dielectric antireflection layer.

15. Composite material in accordance with claim 14, characterized in that an intermediate layer is located between the carrier layer (1) and the reflection layer.

16. Composite material in accordance with claim 14, characterized in that the reflection layer consists of a metal selected from among Al, Cu, Cr, Au, Ag, Ta, Ni, Va, Pt, Fe, Ti and Mo as well as alloys of two or more of these metals, preferably Al or Cu.

17. Composite material in accordance with claim 14, characterized in that the layer consisting of a nitride, a carbide or a carbonitride of a metal or a mixture of two or more metals of subgroup IV, V or VI is a chromium carbide, a chromium nitride or a chromium carbonitride.

18. Composite material in accordance with claim 14, characterized in that the absorber layer has the composition $CrO_xC_yN_z$ or $Ti_rAl_sN_xO_yC_z$, wherein r+s =2, s =0–1.9 and the subscripts x, y and z are selected to be such that the metal compound is substoichiometric concerning its anions.

19. Composite material in accordance with claim 14, characterized in that the optically active layer is a metal oxide layer of a metal from subgroup IV, V or VI or aluminum.

20. Composite material in accordance with claim 14, characterized in that the dielectric and/or oxidic antireflection layer consists of an oxide, nitride or oxynitride of a metal or of silicon.

21. Composite material in accordance with claim 14, characterized in that the dielectric and/or oxidic antireflection layer is the outermost layer on said side.

* * * * *